United States Patent [19]
Rohrmann

[11] Patent Number: 5,756,567
[45] Date of Patent: May 26, 1998

[54] POLYPROPYLENE MOLDING COMPOSITION CONTAINING AN ANTISTATIC AGENT AND HAVING LOW-FOGGING PROPERTIES

[75] Inventor: Jürgen Rohrmann, Kelkheim, Germany

[73] Assignee: Hoechst Aktiengesellschaft, Germany

[21] Appl. No.: 631,616

[22] Filed: Apr. 10, 1996

[30] Foreign Application Priority Data

Apr. 13, 1995 [DE] Germany .......................... 195 13 986.0

[51] Int. Cl.$^6$ ........................................................ C08J 5/16
[52] U.S. Cl. ............................................ 524/232; 524/318
[58] Field of Search ................................ 524/232, 318

[56] References Cited

U.S. PATENT DOCUMENTS 3,627,723  12/1971  Kealy et al. .......................... 524/236

Primary Examiner—Peter D. Mulcahy
Attorney, Agent, or Firm—Connolly & Hutz

[57] ABSTRACT

The injection-molding composition of the invention based on a talc-reinforced propylene polymer contains an additive combination of glyceryl monostearate plus fatty acid dialkanolamide in a mixing ratio in the range from 1:1 to 3:1 and a total amount of up to 1.5% by weight, based on the weight of the propylene polymer.

10 Claims, No Drawings

POLYPROPYLENE MOLDING COMPOSITION CONTAINING AN ANTISTATIC AGENT AND HAVING LOW-FOGGING PROPERTIES

The invention relates to a polypropylene molding composition containing an antistatic agent. Surfaces of moldings produced therefrom therefore have only low dust attraction and for this reason have a low susceptibility to soiling. At the same time the material has low emissions and thus has low fogging values. The molding composition of the invention can be processed by means of the customary processing methods such as injection molding, extrusion and extrusion blow molding.

Motor vehicle interior trim components such as coverings of A, B, C columns, dashboards, door linings, seat coverings, glove compartments and consoles are produced on an industrial scale by injection molding from thermoplastic polymers. For cost reasons, talc-reinforced polypropylene is mainly used in this field of application. Since the parts are present in a visible region, high demands are placed on the visual surface quality. However, undesirable and unsightly soiling of the surfaces by dust deposition frequently occurs because of the low surface conductivity of the polypropylene and as a result of electrostatic charging. Typical dust patterns (crow's feet) thus become visible. These undesirable crow's feet can occur both during the production process of these moldings and also during later assembly or normal use. Since the soiling gives a visual impression of lower quality and is therefore very undesirable, materials which have been made antistatic and do not display these phenomena are increasingly demanded for motor vehicle interiors.

Furthermore, low-emission materials are increasingly demanded for motor vehicle interiors so as to create a pleasant interior atmosphere in the automobile and also to effectively suppress interior fogging of the windows by volatile constituents diffusing out of the plastic components. Low-fogging materials are thus increasingly required for motor vehicle interiors: some motor vehicle manufacturers have now already laid down upper limits for the fogging of interior materials. There are in principle two methods for measuring the fogging value: a reflectometric method and a gravimetric method. The gravimetric method is the more reliable and has now become established. It is described in the standard DIN 75201. The maximum allowable upper limit for the fogging of interior lining materials of current German automobiles is at present <1 mg.

If plastic parts, in particular those of polypropylene, are made antistatic, this is generally achieved by the addition of specific antistatic agents which migrate to the surface of the molding and there form a film of moisture by means of hydrophilic groups. For polypropylene and talc-reinforced polypropylene, glyceryl monostearate, glyceryl distearate and ethoxylated alkylamines are used for this purpose (see: Modern Plastics International, Nov. 1988, 86–92). The moisture increases the surface conductivity and electrostatic charging is avoided. Since the known antistatic additives have to be added in relatively high concentrations to reliably ensure the desired action, and since they themselves are of relatively low molecular weight and furthermore are located on the surface of the moldings, they contribute very greatly to the fogging. Thus, moldings containing an antistatic agent normally always have comparatively high fogging values.

It is thus an object of the present invention to provide particular antistatic agents for talc-reinforced polypropylene which, on the one hand, meet the particularly high requirements for motor vehicle interiors in respect of fogging and, on the other hand, effectively suppress dust deposits resulting from electrostatic forces.

It has now surprisingly been found that this object is achieved according to the invention by an injection-molding composition based on a talc-reinforced propylene polymer containing an additive combination of glyceryl monostearate plus fatty acid dialkanolamide in a mixing ratio in the range from 1:1 to 3:1 and a total amount of up to 1.5% by weight, based on the weight of the propylene polymer.

For the purposes of the present invention, a talc-reinforced propylene polymer is a propylene homopolymer or block copolymer comprising up to 17% by weight of ethylene units and having a talc content of up to 40% by weight, based on the weight of the propylene polymer. However, it is also possible to use random copolymers or graft copolymers comprising propylene building blocks as main constituent or mixtures of polypropylene with other polymers compatible therewith, such as rubber-like copolymers. The addition of talc should preferably be in the range from 10 to 30% by weight.

For the purposes of the present invention, lauric diethanolamide or oleic diethanolamide should preferably be used as fatty acid dialkanolamide, with the preferred total amount of the additive combination of glyceryl monostearate plus fatty acid dialkanolamide being in the range from 0.6 to 1.2% by weight, based on the weight of propylene polymer.

In numerous tests, the injection-molding composition of the invention was found to be more effective in respect of electrostatic charging than the mixtures of glyceryl monostearate and ethoxylated alkylamines known from the literature and, in addition, surprisingly gave lower fogging values.

The following examples are to clarify the invention for those skilled in the art. In these examples, the influence of various antistatic agents on the reduction of electrostatic charging and fogging behavior was examined by preparing talc-reinforced PP compounds comprising a PP copolymer and different concentrations of various antistatic agents. Glyceryl monostearate, mixtures of glyceryl monostearate and glyceryl distearate, ethoxylated alkylamines having different chain lengths and lauric diethanolamide were here used in different concentrations and mixing ratios. The proportion of talc, the chemical composition of the copolymer, the impact modifier and the other additives such as processing stabilizers, antioxidants, light stabilizers and processing aids were not varied.

To examine the electrostatic charging and the soiling, stacking boxes were injection molded from the compounds under constant conditions, demolded by means of suction pick-ups and stored in a relatively dusty place where they were exposed to the prevailing environmental conditions. These conditions duplicate practical conditions very well and simulate a production process for producing an injection-molded part, e.g. for motor vehicle applications. In the case of parts not containing an antistatic agent, the typical dust patterns appear on the surface of the molding after a few hours, but at the latest after a few days. These generally first appear at the point of contact of the suction pick-up, since the greatest charge separation occurs here. For comparison, the specific surface resistance of the moldings was also measured under constant conditions (in accordance with DIN IEC 93; VDE 0303 Part 30, on 1 mm plates 8×8 cm, specific surface resistance=surface resistance×10).

To examine the fogging behavior, 3 mm plates were injection molded under clean conditions and the fogging value was subsequently determined gravimetrically in accordance with DIN 75201 at a temperature of 100° C. over a period of 16 hours. In each case, a mean was determined from 4 measurements which were measured in two passes. The percentages given in the examples are in each case by weight.

It can be seen from Table 1 that in the case of talc-reinforced PP containing an antistatic agent alone, a good antistatic effect does not appear until relatively high concentrations are reached (compounds 5 and 12). However, the fogging values here are very high (fogging values <1 mg are desirable). For mixtures of glyceryl monostearate and ethoxylated amines, antistatic effects are obtained at lower total concentrations (compounds 7 and 9). However, the fogging values here are likewise very high.

Surprisingly, in the case of mixtures of glyceryl monostearate with lauric diethanolamide in a certain concentration ratio, a very good antistatic effect with a very low tendency to soiling is obtained together with a simultaneously low fogging value (compound 11). An unexpected synergistic effect is thus present here. This becomes particularly clear in the comparison of compound 11 with the compounds 4 and 12 in which the antistatic agents were in each case used alone in the same total concentration of 0.7%. The comparison with compounds 7 and 9 also makes it clear that lauric diethanolamide is surprisingly a better synergist in respect of an antistatic effect and the fogging behavior than are the ethoxylated alkylamines used according to the prior art.

The advantage of the additive combination of the invention is thus that an effective antistatic action together with low electrostatic charging can be achieved at low use concentrations and a low long-term tendency to soiling is thus ensured. The undesirable fogging behavior is at the same time greatly reduced. As a result of the higher effectiveness, formulation costs can also be saved during manufacture.

The injection-molding compositions of the invention can be advantageously used for motor vehicle interior trim components such as coverings of A, B, C columns, dashboards, door linings, seat coverings, glove compartments and consoles, but equally well for household goods such as toaster housings, coffee machines, irons, electrical installation components or moldings for office furniture.

The molding compositions of the invention can be processed using the normal processing conditions for polypropylene and reinforced polypropylene. The processing temperatures are, depending on size and geometry of the molding, in the range from 240° C. to 280° C. The tool temperature is generally from 30° C. to 70° C.

EXAMPLE 1 (COMPARATIVE EXAMPLE)

A mixture of 75 parts by weight (pbw) of a propylene block copolymer (7% ethylene content, MFI 230/2.16 of 7.0 g/10 min), 5 pbw of an EPM rubber (52% propylene, 48% ethylene, Mooney viscosity ML (1+4) 125° C. of 80), 20 pbw of talc having a particle size distribution of 99%≦20 μm and 55%≧5 μm, 0.2 pbw of pentaerythrityl tetrakis [3-(3,5-di-tert-butyl-4-hydroxyphenyl)-propionate ], 0.2 pbw of tris(2,4-di-tert-butylphenyl) phosphite, 0.2 pbw of magnesium oxide, 0.2 pbw of a stearically hindered amine and 0.5 pbw of a partially saponified ester wax was extruded in a twin-screw extruder at a composition temperature in the range from 230° C. to 240° C. The mixture had an MFI 230/2.16 of 7.5 cm/10 min and an ignition residue at 625° C. of 19.5%. The tensile elastic modulus (ISO 527) was 2050 MPa and the Charpy notched impact toughness (ISO 179) was 10.4 kJ/m². For further data, see Table 1.

EXAMPLE 2 (COMPARATIVE EXAMPLE)

A mixture was prepared in a twin-screw extruder using a method similar to Example 1, with the sole difference that 0.7 pbw of glyceryl monostearate (purity 55%, remainder glyceryl distearates and tristearates) was additionally added. The results are shown in Table 1.

EXAMPLE 3 (COMPARATIVE EXAMPLE)

A mixture was prepared as in Example 1. However, an amount of 0.5 pbw of glyceryl monostearate (purity 95%, mp. 69° C.) was additionally added. The results are shown in Table 1.

EXAMPLE 4 (COMPARATIVE EXAMPLE)

A mixture was prepared as in Example 1. 0.7 pbw of glyceryl monostearate (purity 95%, mp. 69° C.) was additionally added. The results are shown in Table 1.

EXAMPLE 5 (COMPARATIVE EXAMPLE)

A mixture was prepared as in Example 1. 1.0 pbw of glyceryl monostearate (purity 95%, mp. 69° C.) was additionally added. The results are shown in Table 1.

EXAMPLE 6 (COMPARATIVE EXAMPLE)

A mixture was prepared as in Example 1. 0.3 pbw of glyceryl monostearate (purity 95%, mp. 69° C.) and 0.15 pbw of alkyldiethanolamine (mean chain length: 15 carbon atoms, solidification point: +2° C.) were additionally added. The results are shown in Table 1.

EXAMPLE 7 (COMPARATIVE EXAMPLE)

A mixture was prepared as in Example 1. 0.5 pbw of glyceryl monostearate (purity 95%, mp. 69° C.) and 0.2 pbw of alkyldiethanolamine (mean chain length: 15 carbon atoms, solidification point: +2° C.) were additionally added. The results are shown in Table 1.

EXAMPLE 8 (COMPARATIVE EXAMPLE)

A mixture was prepared as in Example 1. 0.3 pbw of glyceryl monostearate (purity 95%, mp. 69° C.) and 0.15 pbw of alkyldiethanolamine (mean chain length: 18 carbon atoms, solidification point: +60° C.) were additionally added. The results are shown in Table 1.

EXAMPLE 9 (COMPARATIVE EXAMPLE)

A mixture was prepared as in Example 1. 0.5 pbw of glyceryl monostearate (purity 95%, mp. 69° C.) and 0.2 pbw of alkyldiethanolamine (mean chain length: 18 carbon atoms, solidification point: +60° C.) were additionally added. The results are shown in Table 1.

EXAMPLE 10 (COMPARATIVE EXAMPLE)

A mixture was prepared as in Example 1. 0.3 pbw of glyceryl monostearate (purity 95%, mp. 69° C.) and 0.15 pbw of lauric diethanolamide (melting point: about 45° C.) were additionally added. The results are shown in Table 1.

EXAMPLE 11 (ACCORDING TO THE INVENTION)

A mixture was prepared as in Example 1. 0.5 pbw of glyceryl monostearate (purity 95%, mp. 69° C.) and 0.2 pbw of lauric diethanolamide (melting point: about 45° C.) were additionally added. The results are shown in Table 1.

EXAMPLE 12 (COMPARATIVE EXAMPLE)

A mixture was prepared as in Example 1. 0.7 pbw of lauric diethanolamide (melting point: about 45° C.) was additionally added. The results are shown in Table 1.

TABLE 1

| Compound | 1 | 2 | 3 | 4 | 5 | 6 | 7 | 8 | 9 | 10 | 11 | 12 |
|---|---|---|---|---|---|---|---|---|---|---|---|---|
| Glyceryl monostearate 55%[1] (containing glyceryl distearate) | — | 0.7 | — | — | — | — | — | — | — | — | — | — |
| Glyceryl monostearate 95% | — | — | 0.5 | 0.7 | 1 | 0.3 | 0.5 | 0.3 | 0.5 | 0.3 | 0.5 | — |
| Ethoxylated alkylamine (C-15) | — | — | — | — | — | 0.15 | 0.2 | — | — | — | — | — |
| Ethoxylated alkylamine (C-18) | — | — | — | — | — | — | — | 0.15 | 0.2 | — | — | — |
| Lauric diethanolamide | — | — | — | — | — | — | — | — | — | 0.15 | 0.2 | 0.7 |
| Fogging 100° C./16 h (mean) [mg] | 0.42 | 1.0 | 0.72 | 1.10 | 1.40 | 0.93 | 1.47 | 0.86 | 1.41 | 0.62 | 0.92 | 1.23 |
| Soiling after 1 day | great | moderate | moderate | none | none | moderate | none | moderate | none | none | none | none |
| Soiling after 5 days | very great | great | greate | moderate | none | great | none | great | none | moderate | none | moderate |
| Soiling after 14 days | very great | great | great | great | moderate | great | moderate | great | moderate | great | none | moderate |
| Specific surface resistance [Ω] | $1 \times 10^{15}$ | $4 \times 10^{13}$ | $2 \times 10^{14}$ | $8 \times 10^{13}$ | $2 \times 10^{13}$ | $1 \times 10^{14}$ | $3 \times 10^{13}$ | $2 \times 10^{14}$ | $2 \times 10^{13}$ | $1 \times 10^{14}$ | $6 \times 10^{12}$ | $4 \times 10^{13}$ |

[1]Concentrations in % by weight

I claim:

1. An injection-molding composition comprising a talcum-reinforced propylene polymer including talcum in an amount 10 to 40% by weight, based on the weight of the propylene polymer, an additive combination of glyceryl monostearate plus fatty acid dialkanolamide in a mixing ration in the range from 1:1 to 3:1 and in a total amount of 0.6 to 1.5% by weight, based on the weight of the propylene polymer.

2. An injection-molding composition as claimed in claim 1, wherein the propylene polymer is a propylene homopolymer comprising up to 17% by weight of ethylene units.

3. An injection-molding composition as claimed in claim 1, wherein the propylene polymer is a random copolymer or graft copolymer comprising blocks of propylene units as a main constituent and up to 17% by weight of ethylene units.

4. An injection-molding composition as claimed in claim 1, wherein the propylene polymer is a mixture of polypropylene with other polymers compatible therewith.

5. An injection-molding composition as claimed in claim 1, wherein the propylene copolymer is a block copolymer comprising up to 17% by weight of ethylene units.

6. An injection-molding composition as claimed in claim 1, wherein talcum is present in an amount of from 10 to 30% by weight, based on the weight of the propylene polymer.

7. An injection-molding composition as claimed in claim 1, wherein the fatty acid dialkanolamide comprises lauric diethanolamide.

8. An injection-molding composition as claimed in claim 1, wherein the fatty acid dialkanolamide comprises oleic diethanolamide.

9. Method for the preparation of moldings for automotive vehicle interior trim including the step of molding such trim by employing an injection-molding composition as claimed in claim 1.

10. Method for the preparation of household goods including the step of molding such goods by employing an injection-molding composition as claimed in claim 1.

* * * * *

UNITED STATES PATENT AND TRADEMARK OFFICE
CERTIFICATE OF CORRECTION

PATENT NO. : 5,756,567
DATED : May 26, 1998
INVENTOR(S) : Jurgen Rohrmann

It is certified that error appears in the above-identified patent and that said Letters Patent is hereby corrected as shown below:

Column 5, in TABLE 1, column 3, line 8, "greate" should read -- great --.

Column 5, line 32, "talcum-reinforced propylene polymer" should read -- propylene polymer reinforced with talcum --.

Signed and Sealed this

Twenty-ninth Day of September, 1998

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,756,567 Page 1 of 1
DATED : May 26, 1998
INVENTOR(S) : Jürgen Rohrmann It is certified that error appears in the above-identified patent and that said Letters Patent is hereby corrected as shown below:

Column 5,
Table 1, column 3, line 8, "greate" should read -- great --.
Line 32, "talcum-reinforced propylene polymer" should read -- propylene polymer reinforced with talcum --.

Signed and Sealed this

Eighteenth Day of March, 2003

JAMES E. ROGAN
*Director of the United States Patent and Trademark Office*